United States Patent [19]
Chen

[11] Patent Number: 6,152,206
[45] Date of Patent: *Nov. 28, 2000

[54] PLEATED CURTAIN FASTENING DEVICE

[76] Inventor: Ing-Wen Chen, No, 23, Lane 207, Kao-Feng Road, Hsin-Chu, Taiwan

[*] Notice: This patent is subject to a terminal disclaimer.

[21] Appl. No.: 09/353,542

[22] Filed: Jul. 14, 1999

[51] Int. Cl.⁷ .................................................. E06B 9/06
[52] U.S. Cl. ................... 160/84.06; 160/370.23
[58] Field of Search .......................... 160/84.06, 370.23, 160/84.03, 84.04, 84.01, 87, 113, 117, 290.1, 118, 186; 296/97.7, 97.8, 97.9

[56] References Cited

U.S. PATENT DOCUMENTS

| | | | |
|---|---|---|---|
| 4,775,180 | 10/1988 | Phillips | 160/84.01 |
| 4,883,304 | 11/1989 | Elliott | 160/370.23 |
| 4,886,104 | 12/1989 | Eldridge | 160/370.23 |
| 5,269,360 | 12/1993 | Chen | 160/370.23 |
| 5,377,737 | 1/1995 | Moriya et al. | 160/84.06 |
| 5,477,904 | 12/1995 | Yang | 160/370.23 |
| 5,778,955 | 7/1998 | Chen | 160/84.06 |

*Primary Examiner*—David M. Purol
*Attorney, Agent, or Firm*—Pro-Techtor International Services

[57] ABSTRACT

A fastening device for a pleated curtain with an unfolded state and a folded state, consisting of a left pleated curtain and a right pleated curtain, the fastening device comprising: a left shackle, attached to the moving end of the left pleated curtain and having a front part and a T-shaped catch on the front side; a right shackle, attached to the moving end of the right pleated curtain and having a front part and upper and lower wing plates, which are opposite to each other and embrace a T-shaped opening, into which the T-shaped catch of the left shackle fits; and two fixing elements, mounted in a fixed position, each of the fixing elements having a main body, a U-shaped fixing plate and an accommodating space in between, into which one of the front parts of the left or right shackles fits. When the curtain is in the unfolded state, the T-shaped catch of the left shackle is inserted in the T-shaped opening of the right shackle. When the curtain is in the folded state, the front parts of the left and right shackles are inserted in the accommodating spaces of the fixing elements.

3 Claims, 8 Drawing Sheets b a

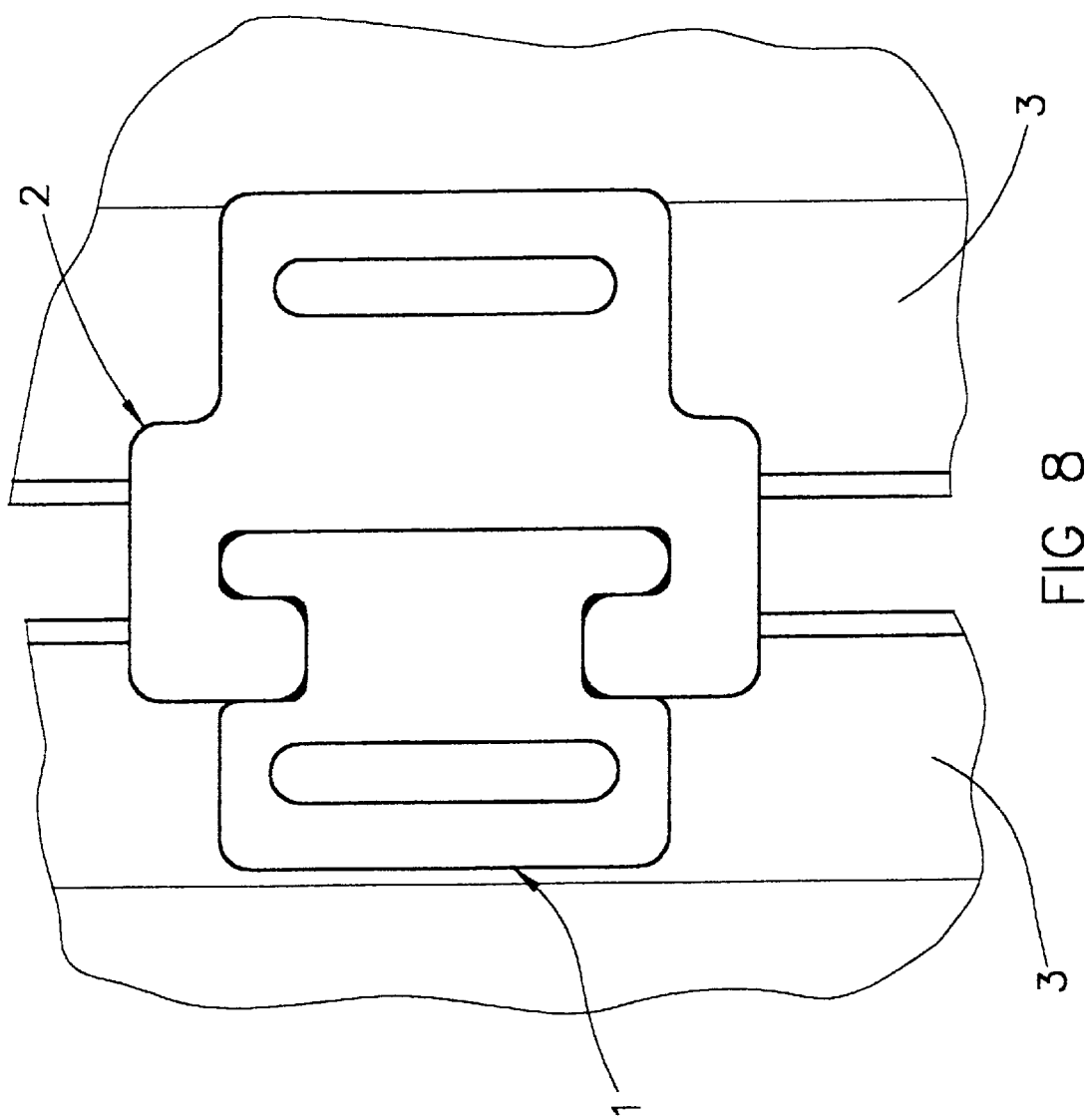

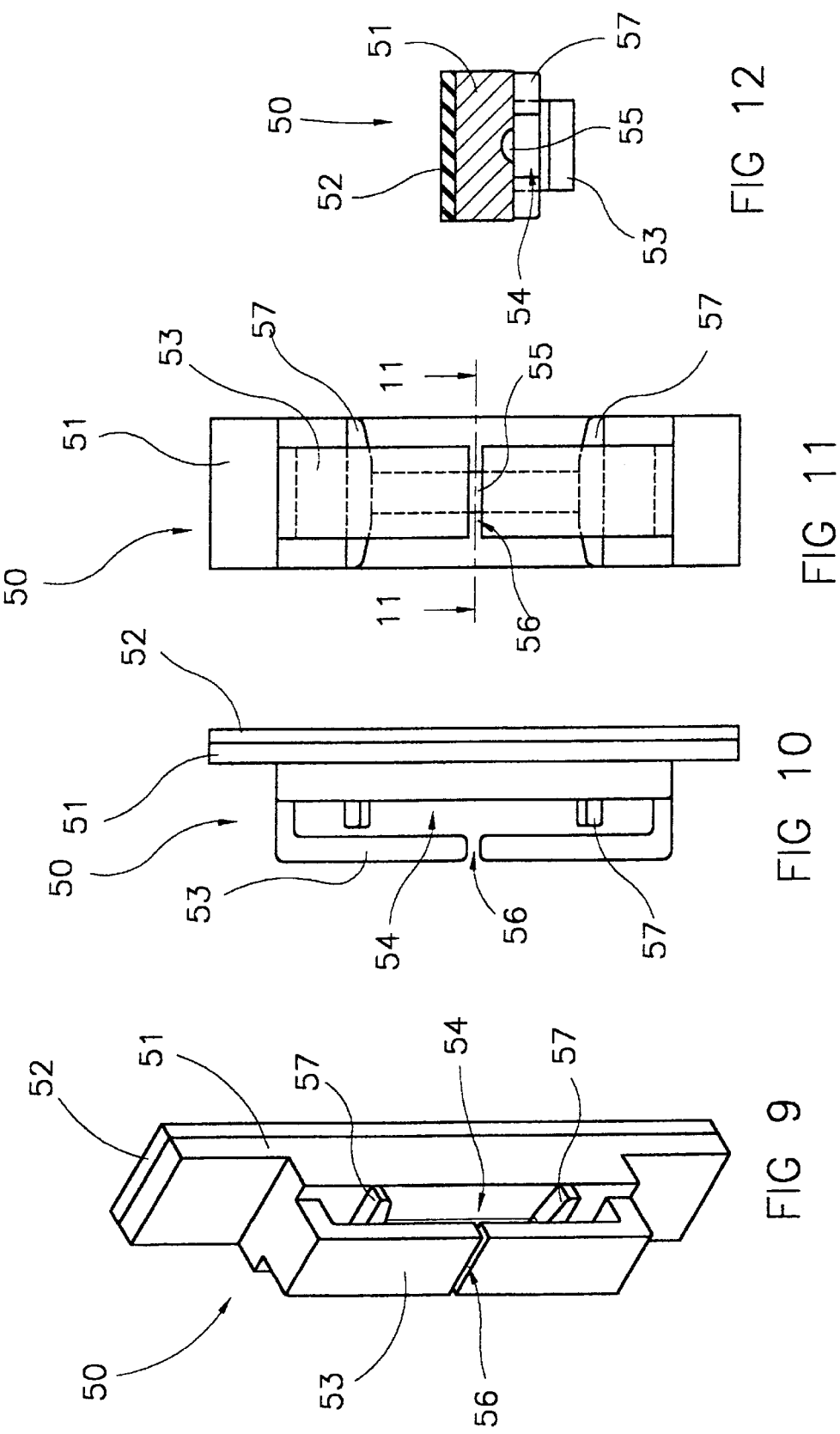

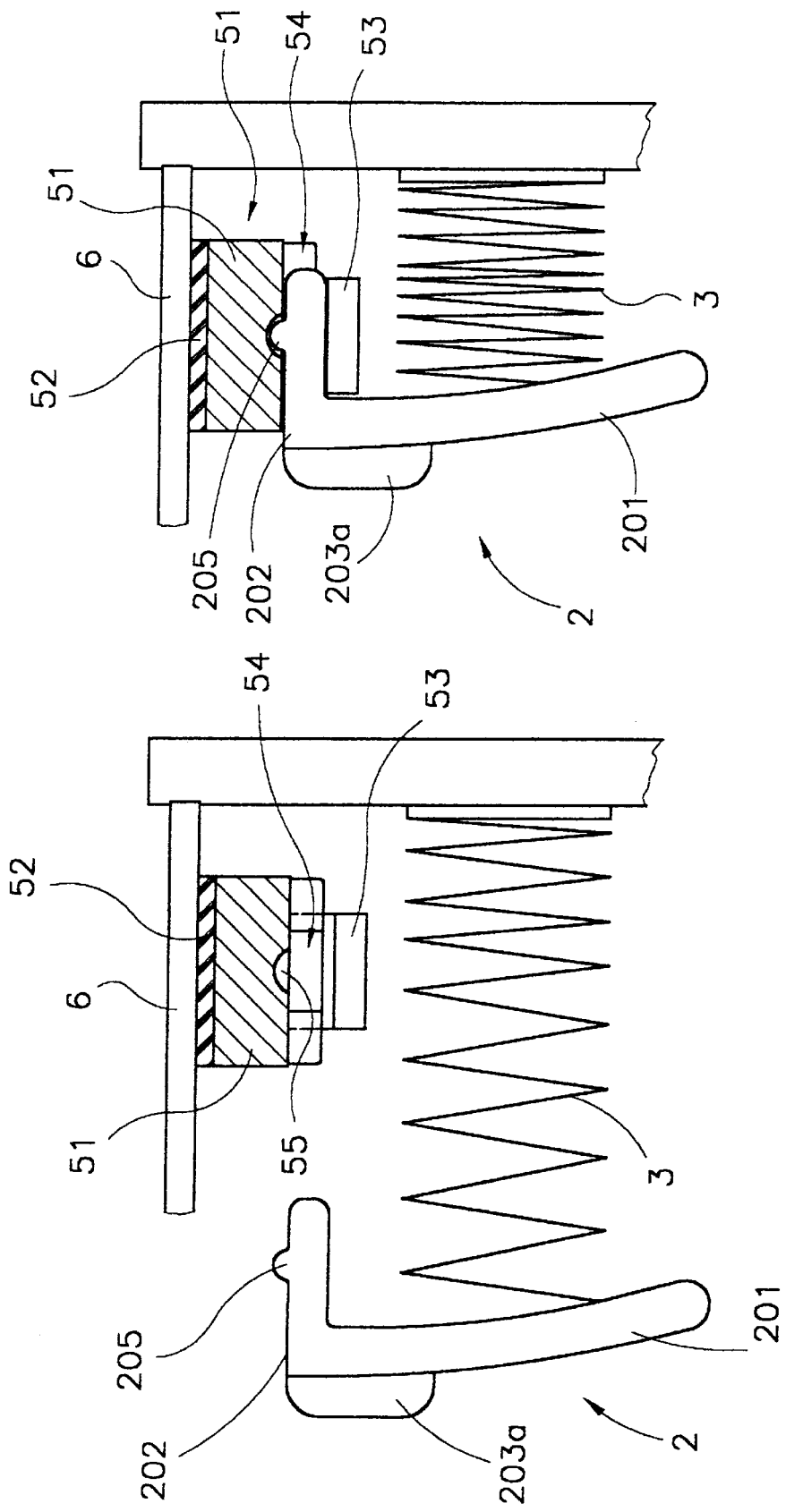

PLEATED CURTAIN FASTENING DEVICE

BACKGROUND OF THE INVENTION

1. Field of the Invention

The present invention relates to a fastening device for a pleated curtain, particularly to a fastening device for a pleated curtain in an unfolded and a folded state, having fixing plates and shackles for easy mounting, dismounting and positioning of the pleated curtain.

2. Description of Related Art

A conventional double pleated curtain is fastened in unfolded and folded states by upper and lower adhesive tapes in the following way: When closing the curtain to the folded state, the movable ends are attached to each other by upper and lower adhesive tapes; when opening the curtain to the unfolded state, the upper and lower adhesive tapes on each movable end are attached to adhesive tapes in fixed positions on a frame. This initially works well. However, exposure to sunlight and temperature changes as well as frequent use leads to a diminished gluing effect, such that the curtain cannot be fastened reliably anymore.

SUMMARY OF THE INVENTION

An object of the present invention is to provide a fastening device for a pleated curtain, which allows to close the curtain quickly.

Another object of the present invention is to provide a fastening device for a pleated curtain, which allows to open the curtain quickly.

A further object of the present invention is to provide a fastening device for a pleated curtain, which allows to close the curtain stably and reliably.

The present invention can be more fully understood by reference to the following description and accompanying drawings.

BRIEF DESCRIPTION OF THE DRAWINGS

FIG. 8 is a front view of the connected left and right shackles of the present invention.

FIG. 9 is a perspective view of the fixing element of the present invention.

FIG. 10 is a side view of the fixing element of the present invention.

FIG. 11 is a rear view of the fixing element of the present invention.

FIG. 12 is a sectional view, taken along line 11—11 of FIG. 11.

FIG. 15 is a schematic illustration of the right shackle and fixing element of the present invention when disconnected.

FIG. 16 is a schematic illustration of the right shackle and fixing element of the present invention when connected.

DETAILED DESCRIPTION OF THE PREFERRED EMBODIMENT

Figure 1:
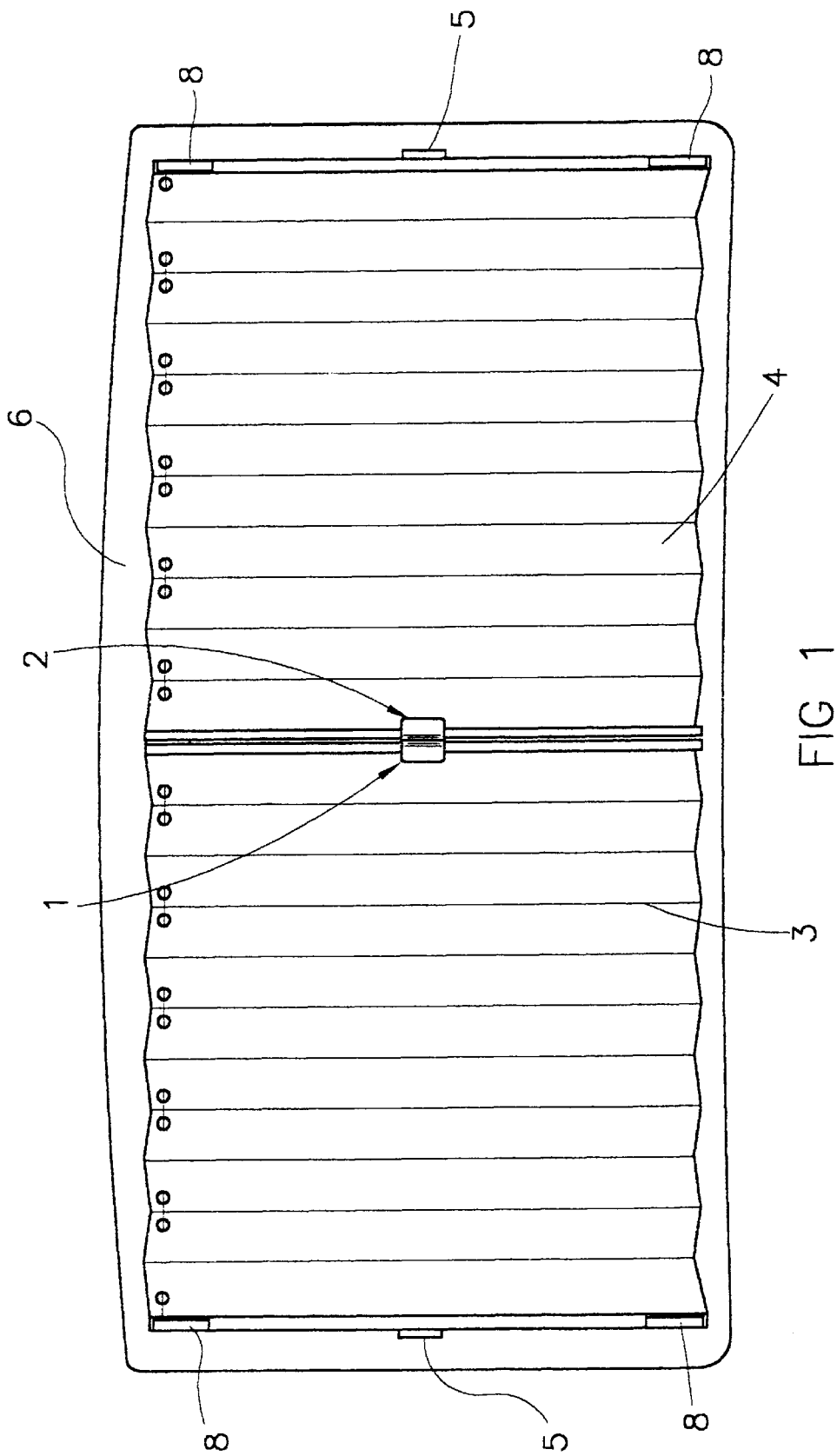
FIG. 1 is a front view of the fastening device of the present invention in conjunction with a double pleated curtain in an unfolded state.
Figure 2:
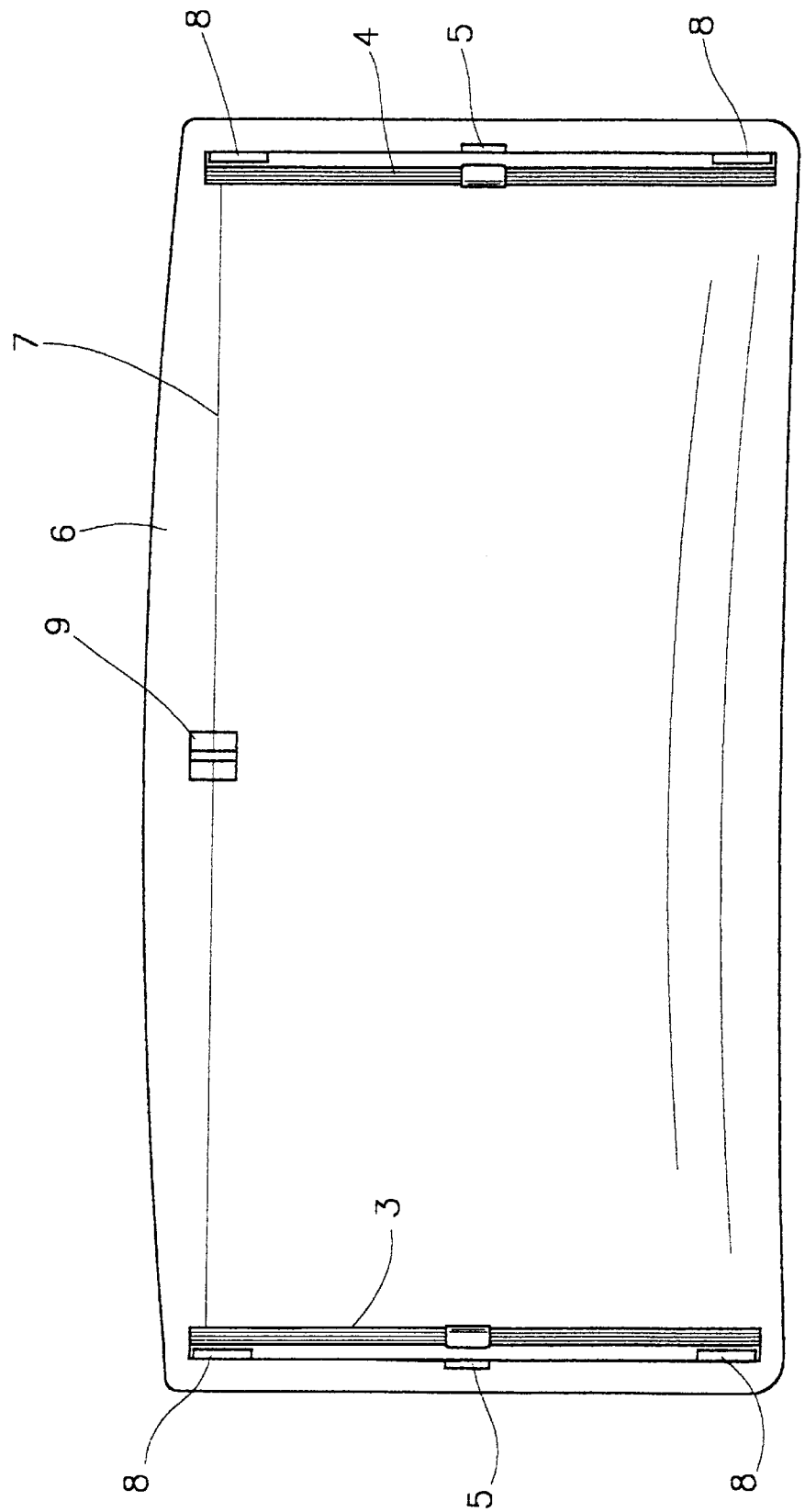
FIG. 2 is a front view of the fastening device of the present invention in conjunction with a double pleated curtain in a folded state.
Figure 3:
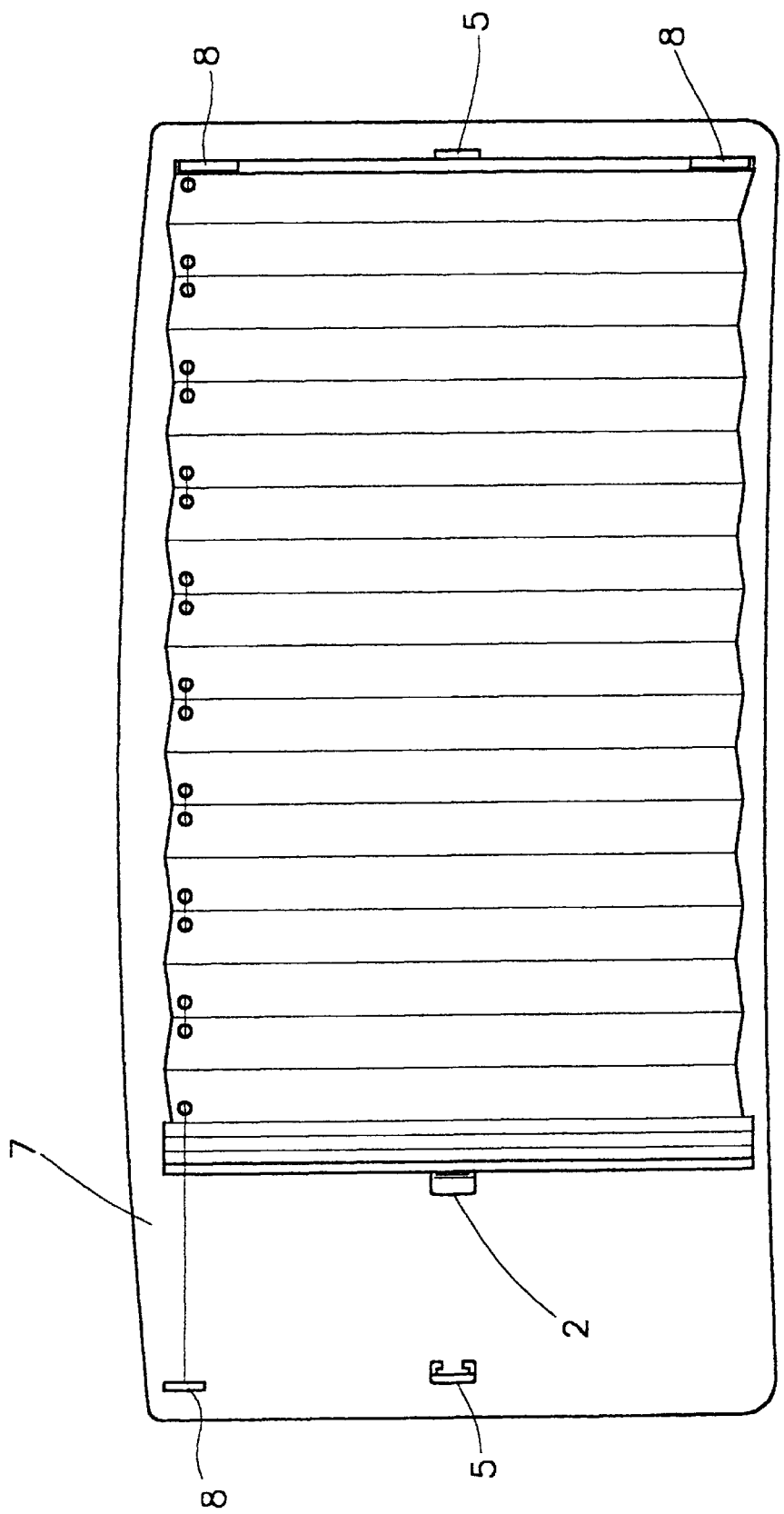
FIG. 3 is a front view of the fastening device of the present invention in conjunction with a single pleated curtain.
Figure 4:
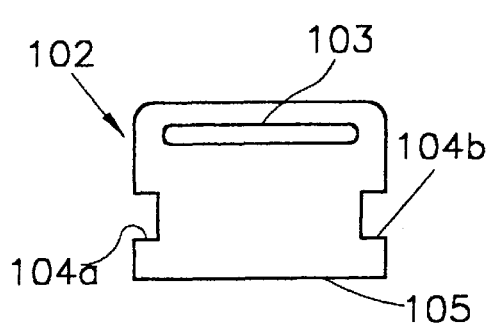
FIG. 4 is a front view of the left shackle of the present invention.
Figure 6:
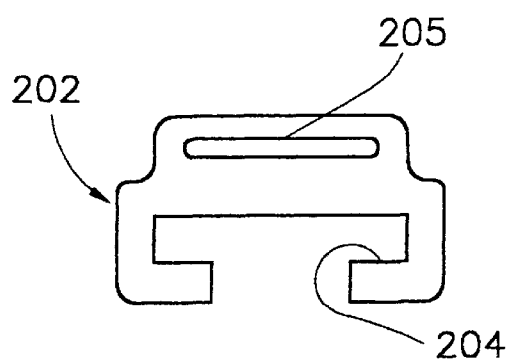
FIG. 6 is a front view of the right shackle of the present invention.
Figure 5:
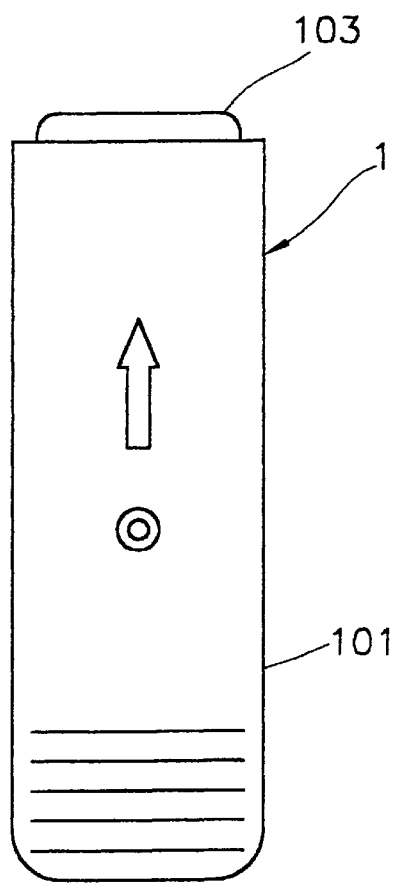
FIG. 5 is a side view of the left shackle of the present invention.

The fastening device of the present invention is used in conjunction with a single pleated curtain 4 (as shown in FIG. 3) or a double pleated curtain (as shown in FIGS. 1 and 2), which consists of two pleated curtains 3, 4 for covering a car window 6. The pleated curtains 3, 4 each have a fixed end and a movable end. For a single curtain, the fastening device of the present invention mainly comprises two fixing elements 5 and a shackle 2. For a double pleated curtain, the fastening device of the present invention mainly comprises two fixing elements 5 and left and right shackles 1, 2. The fixing elements 5 are fastened to the car window 6 or on a frame. For a double pleated curtain, the left and right shackles 1, 2 are each attached to one movable end. When the pleated curtains 3, 4 are folded, the left and right shackles 1, 2 are connected to the fixing elements 5. When the pleated curtains 3, 4 are unfolded, i.e. closed, the left and right shackles 1, 2 are connected with each other. For a single pleated curtain, the shackle 2 is attached to the movable end. Then the pleated curtain 4 is unfolded, the shackle 2 is connected to one of the fixing elements 5. When the curtain is folded, i.e. open, the shackle 2 is connected to the other fixing element 5.

Referring to FIGS. 1 and 2, the fastening device of the present invention has a cord 7, several curtain fasteners 8 and a cord guiding plate 9. These structural elements are the same as in conventionally fastened curtains and do not need to be explained further.

As shown in FIGS. 4, 5, 13 and 14, the left shackle 1 is roughly shaped like the letter L, comprising a main part 101 and a front part 102, which is connected to the main part and has a far end. The main part 101 is slightly curved towards the far end of the front part 102. The main part 101 has a middle section with a bolt hole to be fixed on the pleated curtain 3. The front part 102 has a protrusion 103 on the front side thereof and on the upper and lower edge, closer to the main part 101, two incisions 104a, 104b, such that a T-shaped catch 105 is formed.

As shown in FIGS. 6, 7, 12 and 13, the right shackle 2 is roughly shaped like the letter L, comprising a main part 201 and an front part 202, which is connected to the main part 201 and has a far end. The main part 201 is slightly curved towards the far end of the front part 202. The main part 201 has a middle section with a bolt hole to be fixed on the pleated curtain 4, and, between the middle section and the front part 202, two wing plates 203a, 203b, embracing an open space between them, such that a T-shaped opening is formed. The front part 202 has a protrusion 205 on the front side thereof.

When the pleated curtains 3, 4 are unfolded, their movable ends are brought together. Then the T-shaped catch 105 of the left shackle 1 is inserted into the T-shaped opening of the right shackle 2 from behind, as shown in FIG. 8.

Figure 7:
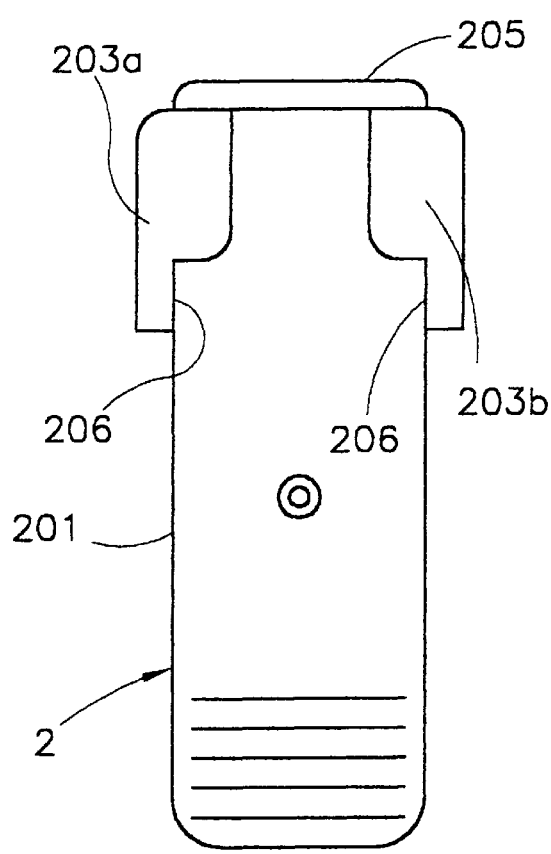
FIG. 7 is a side view of the right shackle of the present invention.

Referring to FIG. 7, the two wing plates 203a, 203b have relatively narrow rear ends 206 to facilitate inserting the T-shaped catch 105.

Referring to FIGS. 9–12, each of the fixing elements 5 comprises: a main body 51 of rectangular shape with a front side and a rear side; a double-adhesive element 52, attached to the front side of the main body for fixing the main body 51 on the car window 6; a fixing plate 53, shaped like a flattened letter U with two legs, which are attached to the rear side of the main body 51; and an accommodating space 54 between the main body 51 and the fixing plate 53. The accommodating space 54 has a width which is larger than the thickness of the front parts 102, 202 of the left and right shackles 1, 2, such that each of the front parts 102, 202 is insertable into the accommodating space 54. A groove 55 is cut into the rear side of the main body 51, taking in the protrusion 103 or the protrusion 205, when one of the front parts 102, 202 is inserted into the accommodating space 54.

As shown in FIG. 10, the fixing plate 53 is divided into two half plates of equal size, separated by a gap 56, for easy deforming of the fixing plate 53 to facilitate inserting of one of the front parts 102, 202 into the accommodating space 54. Two guiding elements 57 protrude from the rear side of the main body 51 into the accommodating space 54 for guiding the insertion of one of the front parts 102, 202 into the accommodating space 54 and for stable positioning thereof without swaying back and forth.

Figure 13:
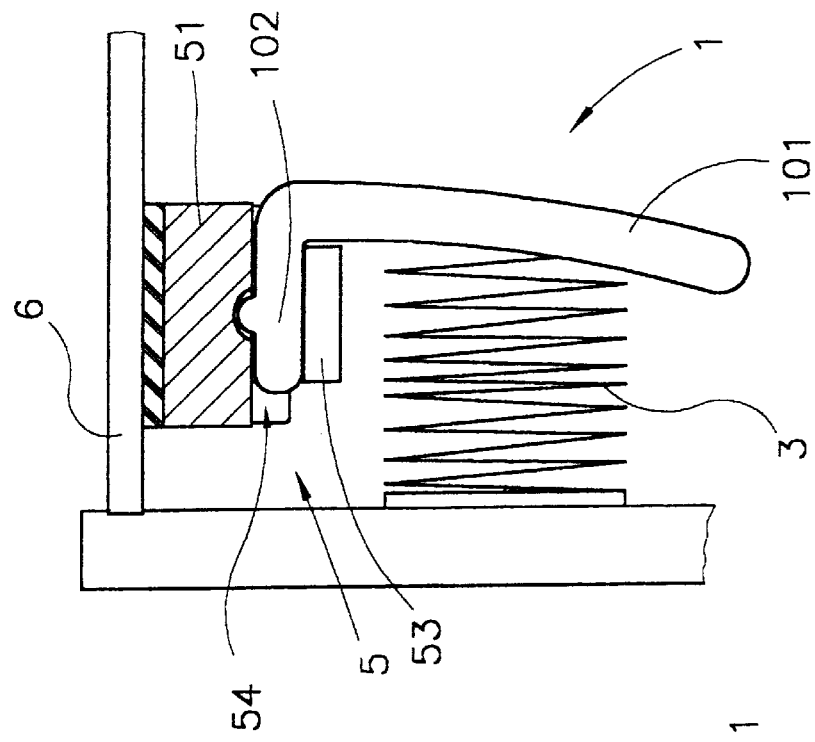
FIG. 13 is a schematic illustration of the left shackle and fixing element of the present invention when disconnected.
Figure 14:
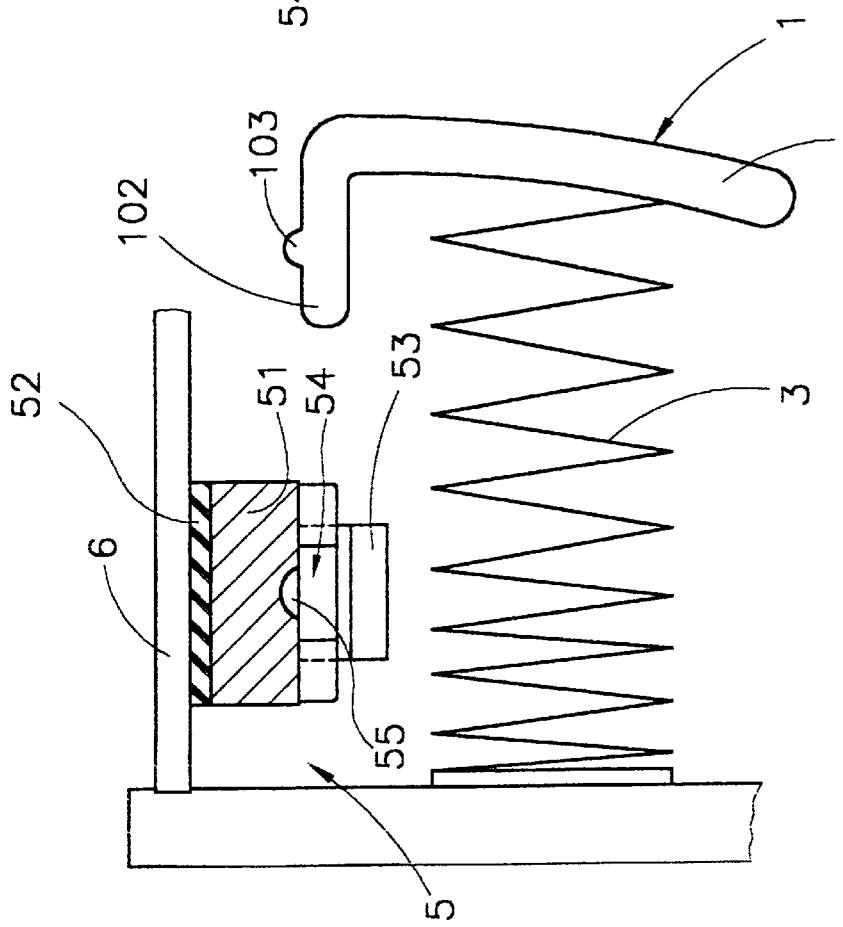
FIG. 14 is a schematic illustration of the left shackle and fixing element of the present invention when connected.

Referring to FIGS. 13 and 14, one of the fixing elements 5 is fastened on the car window 6 by a double-adhesive tape 52 close to the fixed end of the curtains 3 at a position that allows the accommodating space 54 to take in the front part 102 of the left shackle 1, when the curtain 3 is folded.

Similarly, as shown in FIGS. 15 and 16, one of the fixing elements 5 is fastened on the car window 6 close to the fixed end of the curtain 4 at a position that allows the accommodating space 54 to take in the front part 202 of the right shackle 2, when the curtain 4 is folded.

The fixing elements 5 ensure that the curtains 3, 4 are safely fastened when folded, with the front parts 102, 202 secured in the accommodating spaces 54. When the curtains 3, 4 are unfolded, they are safely held together by inserting the T-shaped catch 105 of the left shackle 1 into the T-shaped opening of the right shackle 2. Fastening and unfastening the curtains 3, 4 is fast and convenient.

The structural parts of the present invention are made of plastics of high stability, which is elastic and durable.

While the invention has been described with reference to a preferred embodiment thereof, it is to be understood that modifications or variations may easily be made without departing from the spirit of this invention which is defined by the appended claims.

What is claimed is:

1. A fastening device in combination with a pleated curtain, said fastening device is adapted to be used on a car window, said fastening device and said pleated curtain comprising:

a left pleated curtain and a right pleated curtain, said left pleated curtain and said right pleated curtain each have a fixed end and a moving end and two sides that define a front side and a back side, said pleated curtain having an unfolded state and a folded state, said fastening device comprising a left shackle attached to said moving end of said left pleated curtain, said left shackle having a main part and a front part, said front part of said left shackle has upper and lower edges with two incisions opposite each other, such that a T-shaped catch is formed;

a right shackle attached to said moving end of said right pleated curtain, said right shackle having a main part and a front part, said front part of said right shackle has an upper wing plate and a lower wing plate which are opposite to other and define a T-shaped opening, said T-shaped opening of said right shackle receives said T-shaped catch of said left shackle; said fastening device further comprising two fixing elements, each of said fixing elements comprising a main body having a rear side and a front side that is attached to said car window, and a fixing plate with a gap in a central area thereof, said fixing plate having legs at upper and lower ends, said legs are fixed to said rear side of said main body so as to define an accommodating space between said main body and said fixing plate, said accommodating space is bounded by said legs, said accommodating space receives said front part of a corresponding said left shackle or a corresponding said right shackle;

wherein said T-shaped catch of said left shackle is inserted in said T-shaped opening of said right shackle when said pleated curtain is in said unfolded state, and said front parts of said left and right shackles are respectively inserted in a corresponding ones of said accommodating spaces of said fixing elements when said pleated curtain is in said folded state.

2. The fastening device for a pleated curtain according to claim 1, wherein each said fixing plate comprises two half plates separated by a gap.

3. The fastening device for a pleated curtain according to claim 1, wherein each of said fixing elements comprises two guiding elements protruding from said rear side of said main body.

* * * * *